March 16, 1937.  C. W. AVERY  2,074,158
VEHICLE CONSTRUCTION
Filed July 10, 1933  3 Sheets-Sheet 1
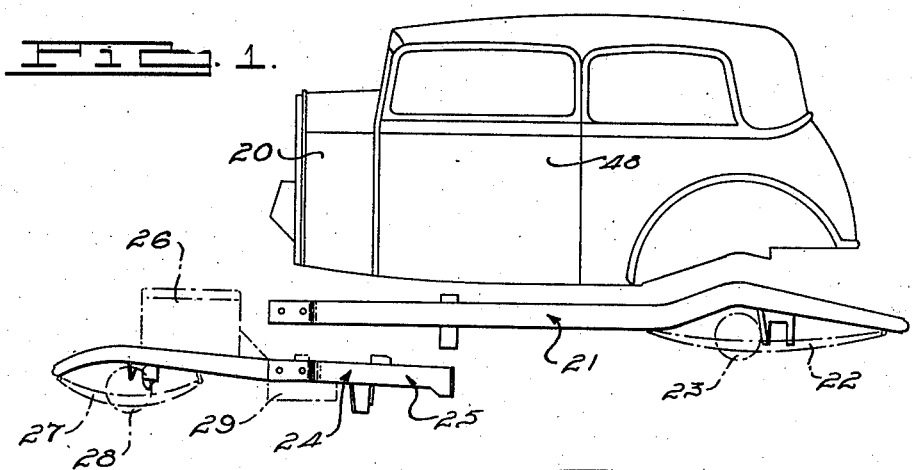
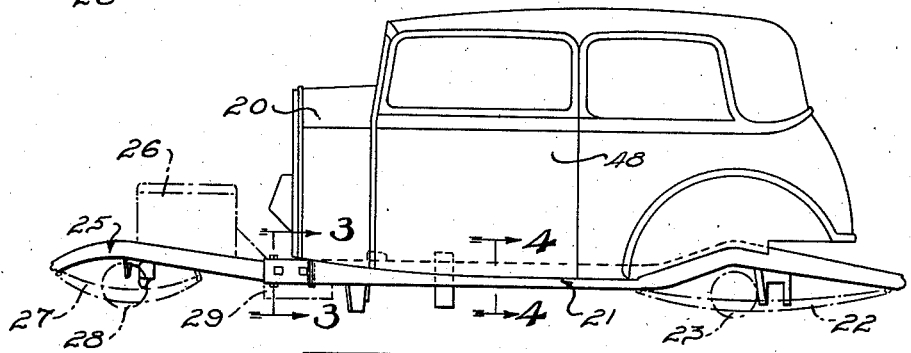
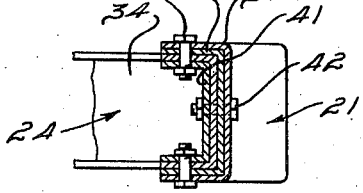
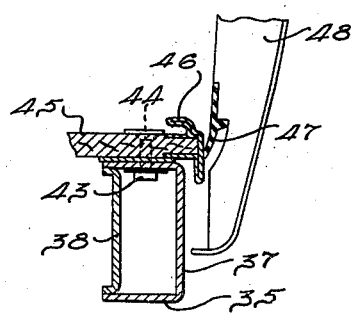
INVENTOR
Clarence W. Avery.
BY
Haines, Wickey, Pierce & Hann.
ATTORNEYS.

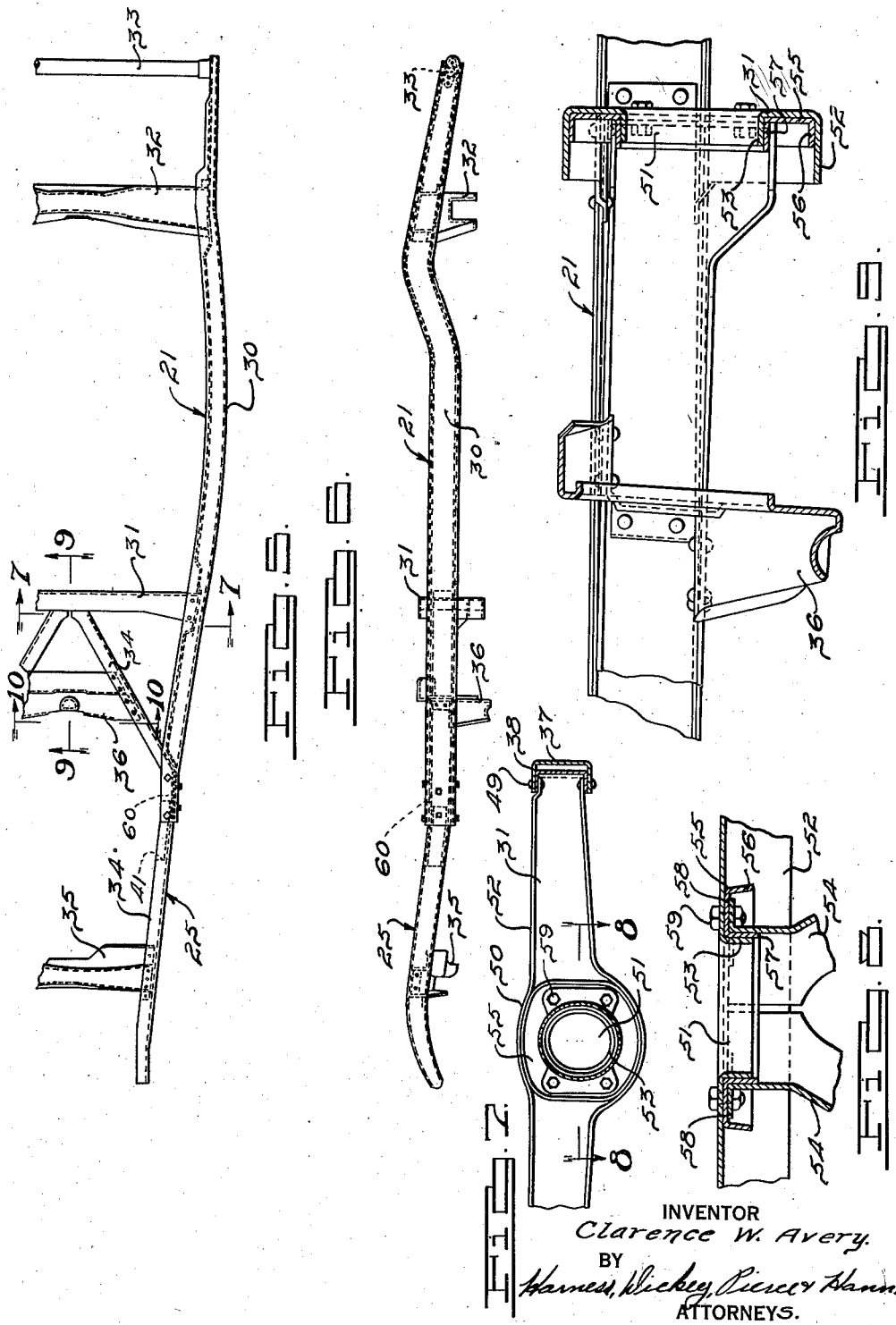

March 16, 1937.　　　C. W. AVERY　　　2,074,158
VEHICLE CONSTRUCTION
Filed July 10, 1933　　　3 Sheets-Sheet 3
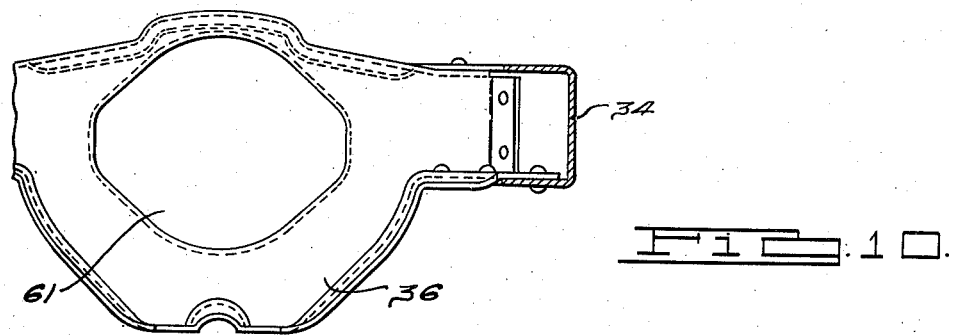
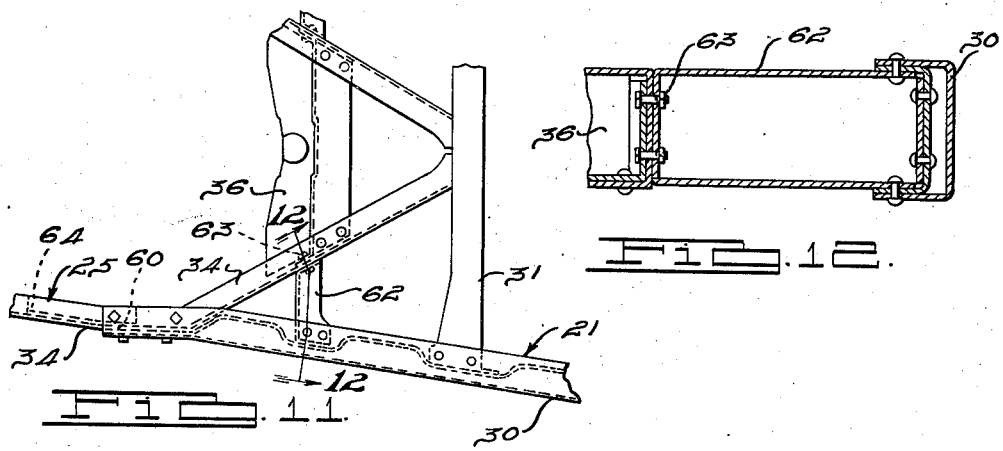
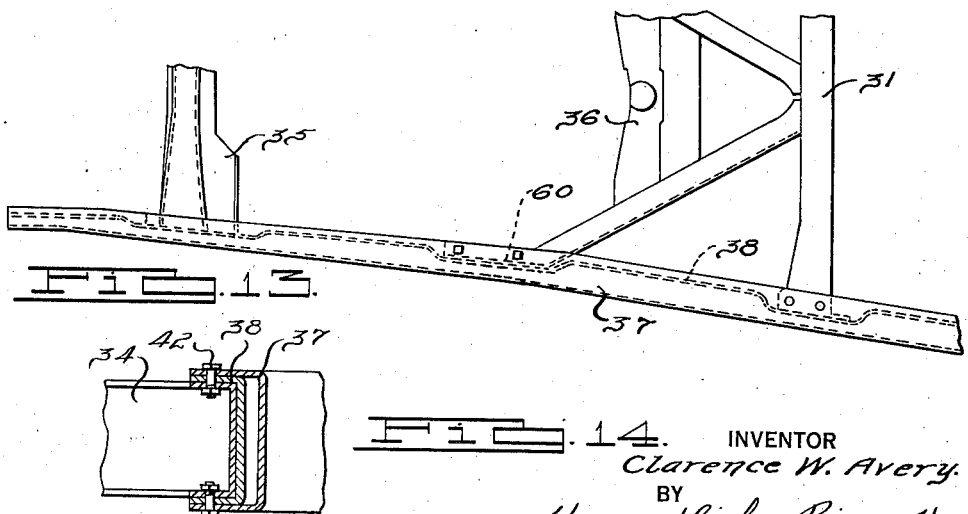
INVENTOR
Clarence W. Avery.
BY
Harness, Dickey, Pierce & Hann.
ATTORNEYS.

Patented Mar. 16, 1937

2,074,158

UNITED STATES PATENT OFFICE 2,074,158

VEHICLE CONSTRUCTION

Clarence W. Avery, Detroit, Mich.

Application July 10, 1933, Serial No. 679,616

9 Claims. (Cl. 280—106)

My invention relates to automobile constructions and particularly to an automobile wherein sub-assembly units are provided which are readily securable together, designed particularly to facilitate the shipping of automobiles in freight cars and vessels which more efficiently employ the space by shipping in sub-assembly units and which eliminate a large part of the assembly expense at the manufacturing plant and at points remote therefrom.

The broad concept of my invention has been disclosed, described and claimed in my co-pending application Serial No. 667,362, filed April 22, 1933, embodying primarily the separation of the chassis frame at the front terminal end of the body forming two sub-assembly units, the front unit comprising the engine, hood, front wheels, springs and transmission and a rear sub-assembly embodying the rear wheels, springs, propeller shaft, differential and body. A complete automobile chassis is provided through the attachment of the rear portion of the front chassis section to the front portion of the rear chassis section in a fixed or releasable manner.

My present invention embodies a commercial construction of the device and therefore is a further extension of the invention described and claimed in the above mentioned application. In the present construction the rear end of the side elements of the front chassis section are united by a flanged plate which encompasses the end and which is provided with an aperture through which the propeller housing and shaft extend. The rear engine mounting frame is supported on the converging portion of the rear extensions of the front section and braces are illustrated which may be employed at this point for preventing any side vibration to the front chassis section. The rear section has the longitudinally extending side portions made of box section by the securing of two channel elements of different depths together throughout the length of the members except for the points at which the bracing is to occur where the inner channel element is disposed adjacent to the web portion of the outer channel element to provide space for securing the bracing element thereto. The complete chassis section when assembled together forms an extremely rigid construction which, from test, has proven that the construction is stronger than the present unit chassis frame employed on a like automobile.

Accordingly, the main objects of my invention are to provide sub-assembly units which are readily joined together to form a complete automobile chassis; to provide a chassis section for a vehicle body having longitudinally extending side members which are of box section construction; to provide a chassis portion for the front sub-assembly which has converging longitudinal side portions which are joined together in unit construction; to provide a supporting element for an engine interconnecting the side converging portions of the chassis frame; and, in general, to construct an automobile body with a separable chassis frame which, when joined together, is of greater strength than the unit chassis frame now employed.

Other objects and features of novelty of my invention will be either specifically pointed out or will become apparent when referring, for a better understanding of my invention, to the following description taken in conjunction with the accompanying drawings, wherein:

Figure 1 is an exploded view of an automobile embodying features of my invention, Fig. 2 is a view of the elements illustrated in Fig. 1, in assembled relation, Fig. 3 is an enlarged sectional view of the structure illustrated in Fig. 2, taken on the line 3—3 thereof, Fig. 4 is an enlarged sectional view of the structure illustrated in Fig. 2, taken on the line 4—4 thereof, Fig. 5 is a broken plan view of the chassis frame units when assembled together, Fig. 6 is a view in elevation of the structure illustrated in Fig. 5, Fig. 7 is an enlarged sectional view of the structure illustrated in Fig. 5, taken on the line 7—7 thereof, Fig. 8 is an enlarged sectional view of the structure illustrated in Fig. 7, taken on the line 8—8 thereof, Fig. 9 is an enlarged sectional view of the structure illustrated in Fig. 5, taken on the line 9—9 thereof, Fig. 10 is an enlarged sectional view of the structure illustrated in Fig. 5, taken on the line 10—10 thereof, Fig. 11 is an enlarged broken view of the structure illustrated in Fig. 5, Fig. 12 is an enlarged sectional view of the structure illustrated in Fig. 11, taken on the line 12—12 thereof, Fig. 13 is a view similar to that illustrated in Fig. 11 showing a modified form thereof, and Fig. 14 is a view of structure similar to that illustrated in Fig. 3, showing a modified form thereof.

Referring to Fig. 1, I have illustrated an automobile body 20 which is to be secured to a rear chassis section 21, preferably in unit assembly therewith, the chassis frame having the rear springs 22 thereon which are secured to the rear axle housing 23 in a well known manner. A front sub-assembly unit 24 comprises the front chassis section 25 having an engine 26 mounted thereon along with the front springs 27 and front axle 28 with the transmission 29 and steering gear. The front sub-assembly 24 is attachable to the rear chassis section 21 in any suitable manner, preferably by bolts or other releasable means which permits the chassis to be separated so that the engine portion may be removed from the body portion to be readily worked upon. The assembly of the units to form a unit vehicle is illustrated in Fig. 2.

Referring to Figs. 5 and 6, the rear chassis portion 21 is made up of longitudinally extending members 30 having a front cross brace and rear cross braces 31, 32 and 33 respectively. The front chassis section 25 is likewise provided with two longitudinal members 34 having a front cross brace 35 which forms the front support for the automobile engine. The longitudinal members 34 are inwardly converging and are joined by a brace 36 which forms the rear support for the engine and which are further joined together at the terminal end of the section 25 in a manner which will be described more fully hereinafter. In Fig. 5 only the left hand section of the chassis frame is illustrated since the right hand portion is the same as the left hand portion except it being of the opposite hand.

In Figs. 3 and 4, the longitudinally extending element 30 of the rear chassis section 21 is illustrated as being formed from two inwardly presenting channel-shaped elements, an outer element 37 and an inner element 38 which nests therein and which is of less depth, having short side walls which are secured to the side flanges of the outer element 37. The securing is done preferably by spot welding so as not to heat the elements to cause their distorting which would occur upon the warping of the material. It is to be understood, however, that steam welding, bolting, riveting or any other well known means may be employed for securing the two channel elements together to form a box section for the rear chassis section 21. The inner chassis element 38 is offset at the end and at points throughout the longitudinal length of the element 38 at which bracing elements are to be secured to the longitudinal member.

In Fig. 3 I have illustrated the element 38 as being inwardly pressed within the outer member 37 to have the web thereof in complete nested relation and the side walls or flanges of the element 38 extended to the full depth of the flanges of the element 37. The front longitudinally extending portion 34 of the front chassis section 25 joins with the rear section, being nested within the channel element 38 and having nested within itself a reinforcing channel element 41 to provide strength to the front longitudinally extending member. Bolts 42 are illustrated as being employed for joining the front and rear chassis sections together but it is to be understood that if the sections are to be retained in fixed relation after complete assembly, rivets, welding, brazing or the like may be substituted for the bolts 42. I preferably employ bolts or other readily separable means which, while retaining the two sections in tight relation, permit the sections to be separated.

Threaded elements 43 are preferably secured to the inner surface of the channel element 37 as illustrated more clearly in Fig. 4 for the purpose of having the bolts 44 threaded therein for securing a floor board 45 to the chassis frame. A scuff plate 46 is secured to the floor board at the door opening, as illustrated more clearly in Fig. 4, against which a sealing element 47 of a door 48 may abut.

The cross brace 31 is illustrated enlarged in Fig. 7 wherein the offset relation of the inner channel element 38 from the channel element 37 is more clearly shown and which provides room for the securing of the cross member 31 to the longitudinal channel element. This is preferably effected by the use of rivets 49 although it is to be understood that welding, brazing or other means may be employed. The brace 31 is enlarged at the central portion 50 to provide an aperture 51 through which the propeller shaft housing extends. The element 31 has an outer marginal flange 52 and a flange 53 is provided at the edge of the opening 51. The flange is more clearly illustrated in Fig. 8 as forming means for closely engaging the end of the front section 25 of the chassis.

The converging portions 54 of the chassis are welded, brazed or otherwise secured to an annular gusset plate 55 having outer flanges 56 and inner flanges 57. Flanges 58 are formed on the end of the diverging portions 54 which are readily welded, brazed or otherwise secured to the element 55. The element 55 projects over the flange 53 and nests within the flange 52 on the element 31 and is secured thereto preferably by the bolts 59. When, however, the front and rear chassis sections are to remain in permanent engagement, rivets, welding or other means may be employed in lieu of the bolts. The flanges 56 and 57 are preferably tapered diverging from the flange 58 to be sprung inwardly when the gusset plate 55 is pulled by the bolts 59 into firm relation to the cross brace 31. In this manner the flange 57 is in tight relation to the flange 53 and to the flanges 52 of the cross member.

In a similar manner, a taper is provided to the portion 60 of the front chassis section 25 for the purpose of permitting the sliding engagement of the portion and the end of the longitudinal member 30 of the rear chassis section 21. A tight engagement is effected between the two parts before the bolts 59 are drawn up to form a firm joinder between the elements 55 and 58 of the sections. In Fig. 9, I have illustrated in longitudinal section the rear motor support and brace 36 and the engagement of the gusset plate 55 with the cross brace 31. The tight fit between the flanges 56, 57, 52 and 53 is clearly illustrated.

The motor support as illustrated more clearly in Fig. 10 is of conventional form having an aperture 61 therein through which the transmission and propeller shaft housing extend and which forms a cradle for bracing and supporting the rear end of the engine. In Figs. 11 and 12 I have illustrated a side bracing element 62 which may be riveted to the longitudinally extending members 30 of the chassis section 21 and which mate with the converging portion of the front chassis section 25 to be fixed thereto by a bolt 63 or other suitable securing means. The securing of the element 62 by the bolt 63 is shown more clearly in Fig. 12. A channel shaped reinforcing member 64 is nested in the member 34 and overlaps the forward end of the member 30, as shown in Fig. 11.

In Fig. 13 the brace 62 is omitted since it was found in practice that, under certain conditions and certain types of bodies, the brace was not necessary and sufficient rigidity was obtained without the employment of the brace. In this construction the only connections between the front and rear chassis sections are at the portions 60 and between the gusset plate 55 and the cross frame 31.

In Fig. 5, I have illustrated a channel member 41 which is disposed adjacent to the portion 60 of the longitudinally extending members 34 of the front chassis section which is employed to add strength to the front longitudinal member at a point where the steering apparatus is secured. This is illustrated as the element 64 in Fig. 11. In Fig. 13, I have illustrated a box section structure extending from the front to the extreme end of a unit chassis frame.

It is well known that the box section structure is considerably stronger than the mere disposition of two plates directly together, and for this reason material strength is added to the entire chassis frame. In a similar manner the front section could be made of box section construction so that such section would extend from the front end of the front section to the rear end of the rear section, all points thereof having box section construction. At all of the bracing points the outer section is offset inwardly having the flange extended so that at the inwardly extending portions the flanges on the inner and outer portions terminate in the same plane. This may be accomplished by forming a channel with unit side members and after being preformed to have portions offset as illustrated in the figure, pieces may be welded therein to form a straight line of the ends of the side flanges or a deep channel may be employed and after the forming operation the projecting edges may be trimmed off to have them mate with the edges of the outer channel element 37.

In Fig. 14 I have illustrated a section at the point 60 of the joined frame which is similar to the section of Fig. 3 with the exception that the front section 25 and rear section 21 are mated together with the rear section being of box section construction at the joint. It is to be understood that the elements 34 of the section 25 may also be of box section. By having a box section chassis, that is to say, the longitudinally extending members from the front to the rear end of the chassis frame being of box section, material strength is added to the construction whether or not the chassis is separable or constructed as a unit. When a unit chassis construction, as illustrated in Fig. 13, is employed, the same construction will be utilized except for the elimination of the joint at the point 60 which may have a wide box section construction or which may be offset to receive cross bracing members or X members as commonly employed in the art.

While I have described and illustrated but two embodiments of my invention, it will be apparent to those skilled in the art that various changes, omissions, additions and substitutions may be made therein without departing from the spirit and scope of my invention, as set forth in the accompanying claims.

'I claim as my invention:

1. A chassis frame having longitudinally extending side members of box section formed by inwardly presented channel elements, the inner channel elements having portions of the web deflected inwardly from other portions thereof and the sides extended at these portions to have the edges of the flanges terminate in a plane and aligned with the flanges of the first said channel elements, and cross braces interconnecting the longitudinal side members at the points where the webs of the inner channel elements are offset.

2. A chassis frame comprising two sections which are mateable with each other to form a unit construction including, in combination, longitudinally extending side members on one section having cross braces therebetween forming a unit construction upon which a body may be secured, one of said cross braces being flanged, a front section likewise provided with longitudinally extending side members and cross braces, the rear portion of said front section converging at the rear end, and an annular flanged element secured to the rear end of the front section and nested within the flanged cross brace of the rear chassis section.

3. In a motor vehicle, a chassis frame formed of front and rear sections engageable with each other at the sides, a portion of the rear section being flanged to receive the end of the front section in telescopically nested relation, the interfitting end of the front section being flanged in tapered relation to the nesting flange on said rear section, and means for drawing said portions together to have the tapered portions sprung to form a tight joint.

4. In a motor vehicle, a chassis frame of separable front and rear sections, the front section joining the rear section at two sides and a central portion, all of which are in telescopically tapered relation to each other at the joining portions, and means for drawing the two central portions together and thereby causing the tapered side portions to snugly interfit.

5. In a motor vehicle, a chassis having separate front and rear sections, the rear section having at least two cross-braces, the front section including side elements interconnected by a cross-brace and having the rear ends converging, a brace interconnecting said converging portions, and securing means for said sections for uniting the front section in aligned extension with said rear section with the converging end engaging a cross-brace to form a K frame laterally of the chassis.

6. A separable chassis frame including, in combination, a front section having side rails converging at the rear, cross braces for said rails, a rear section having side rails and cross braces, and separable connection for uniting said sections with the rails in longitudinal extension and the converging portion engaged with a brace of the rear section to form a K frame laterally of the chassis.

7. A chassis frame, including in combination, a front section made up of spaced side elements the rear portions of which are in converging relation, a rear section likewise having spaced side elements which mate with the side elements of the front section near the point where the side elements begin to converge, and a cross-brace on the rear section engaged by the ends of the converging front side elements.

8. A chassis frame made up of front and rear sections having side members, the front section having the rear portion of the side members in converging relation to provide an aperture, a cross-brace between the side members of the rear chassis section having an aperture, and means for retaining said two sections together with the apertures in aligned abutted relation.

9. A chassis frame, including a front and a rear section, both sections having longitudinal extending members which mate with each other to form the side elements of the complete chassis frame, the front elements converging and extending beyond the point of engagement of the side members, and a cross-brace on the rear section engaged by the converging portions of the front section.

CLARENCE W. AVERY.